United States Patent [19]

Tüma et al.

[11] 4,096,528
[45] Jun. 20, 1978

[54] STANDARD/NONSTANDARD INTERNAL VERTICAL SYNC PRODUCING APPARATUS

[75] Inventors: Alois Václav Tüma, Schlieren; Willem Hendrik Groeneweg, Ottenbach, both of Switzerland

[73] Assignee: RCA Corporation, New York, N.Y.

[21] Appl. No.: 699,848

[22] Filed: Jun. 25, 1976

[30] Foreign Application Priority Data

Dec. 23, 1975 United Kingdom ............... 52565/75

[51] Int. Cl.² ............................................. H04N 5/04
[52] U.S. Cl. ..................... 358/148; 358/158
[58] Field of Search ................................. 358/148, 158

[56] References Cited

U.S. PATENT DOCUMENTS

| | | | |
|---|---|---|---|
| 3,691,297 | 9/1972 | Merrell et al. | 358/158 |
| 3,814,855 | 6/1974 | Kokado | 358/148 |
| 3,899,635 | 8/1975 | Steckler et al. | 358/148 |
| 3,904,823 | 9/1975 | Van Straaten | 358/148 |
| 3,916,102 | 10/1975 | Merrell | 358/158 |

Primary Examiner—Richard Murray
Attorney, Agent, or Firm—Eugene M. Whitacre; Paul J. Rasmussen; Joseph Laks

[57] ABSTRACT

Apparatus for producing internal vertical sync signals from a source of standard and nonstandard rate external vertical signals. The apparatus includes a counting and reset arrangement for generating internal vertical sync signals in synchronization with the external vertical signals when the external signals are occurring at a standard rate. A nonstandard signal sampling arrangement causes the generation of the internal vertical sync signals in synchronization with the external signals at a nonstandard rate after a predetermined time in which these nonstandard signals occur. Still other circuit elements generate standard rate internal vertical sync signals during the predetermined time in which these nonstandard rate signals occur.

6 Claims, 3 Drawing Figures

STANDARD/NONSTANDARD INTERNAL VERTICAL SYNC PRODUCING APPARATUS

BACKGROUND OF THE INVENTION

This invention relates to television receiver vertical deflection synchronization systems.

In television receivers, the vertical field scanning must be synchronized with the horizontal line scanning for proper image display. If the scanning is not synchronized, undesirable effects, such as image roll, may occur. To provide for synchronization, the received video signal, which includes both horizontal and vertical sync pulse components, is processed by the television receiver circuits in a manner which extracts the appropriate synchronizing information.

In a television system, for example, such as the PAL system, two vertical field sync pulses occur during every 625 horizontal line sync pulses. The vertical frequency is approximately 50 Hz, and the horizontal frequency $f_H$ is approximately 15,625 Hz.

To provide for noise immunity, prior art circuits have been developed where internally generated vertical sync pulses drive the vertical deflection circuits of a television receiver. If the internally generated pulses lose synchronization with the external sync pulses, they are then periodically resynchronized to the external signals.

These prior art circuits generally cannot function as designed when nonstandard external signals of a frequency significantly different than 625 lines per frame are received. Generally this is because in the internal free running mode the circuits operate on a 625 count and reset basis and noise immunity gating cirucits will not accept an external signal which occurs other than at a 625 count rate. Nonstandard signals, for example, are produced by some service type television pattern generators; they can exist during the reframing process used by television networks when switching between nonsynchronous signal sources; or they may occur when slant track recorders are operated in the stop mode for single frame playback.

Other circuits do provide for nonstandard mode operation immediately upon receipt of a nonstandard external signal. These circuits, however, lose some of their noise immunity features, because the noise pulses which last for several field intervals are processed as nonstandard external signals.

SUMMARY OF THE INVENTION

Apparatus produces internal vertical sync signals from a source of standard and nonstandard rate external vertical signals. The apparatus includes circuit elements for generating internal vertical sync signals in synchronization with the external vertical signals when the external signals are occurring at a standard rate. A nonstandard signal sampling arrangement causes the generation of the internal vertical sync signals in synchronization with the external signals at a nonstandard rate after a predetermined time in which these nonstandard signals occur and the generation of standard rate internal vertical sync signals during the predetermined time in which these nonstandard rate signals occur.

DESCRIPTION OF THE INVENTION

Figure 1:
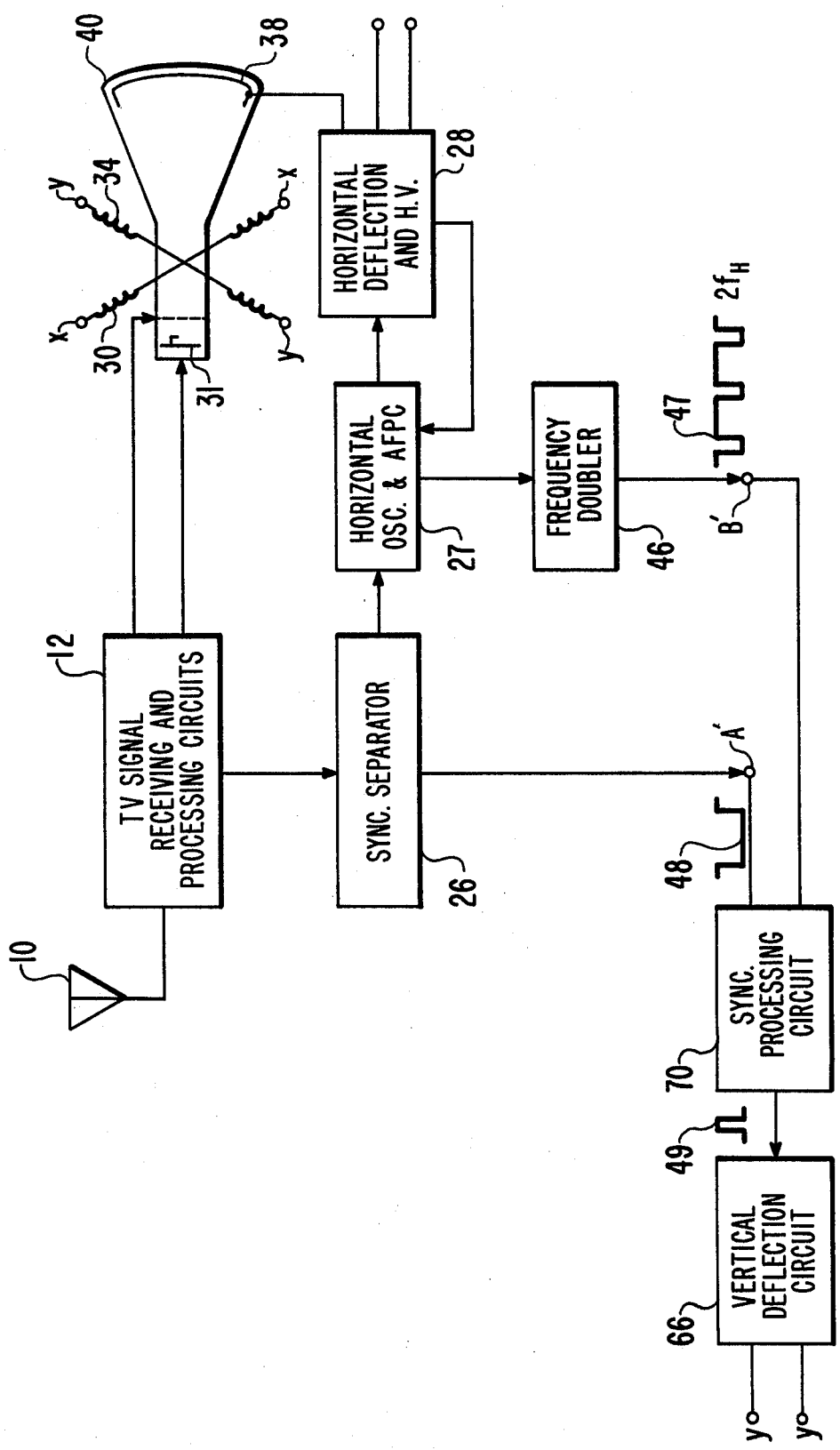
FIG. 1 is a functional block diagram of a television receiver embodying a synchronization system according to the invention.

In FIG. 1, an antenna 10 couples received video, audio and deflection synchronization information to a complement of television signal receiving and processing circuits 12 including a tuner and RF amplifier, IF amplifier, audio detecting and amplifying circuits and a speaker, video detectors, a video amplifier and in color television receivers, chrominance and color reference circuitry. All of the circuits represented by block 12 may be conventional circuits known in the art. Television signal receiving and processing circuit 12 is coupled to a cathode ray tube 40 through a cathode 31 and through a control grid 32.

Circuit 12 is coupled to a sync separator 26 which extracts from the video signals external vertical and horizontal sync pulses.

Horizontal sync information is supplied to a horizontal oscillator and automatic frequency and phase control (AFPC) circuit 27 to which sync separator 26 is coupled. Horizontal oscillator and AFPC circuit 27 is coupled to a horizontal deflection and high voltage circuit 28. A high voltage circuit in circuit 28 is connected to the cathode ray tube 40 and provides accelerating potential to a final anode 38 of cathode ray tube 40.

A horizontal deflection amplifier in circuit 28 supplies horizontal deflection current to horizontal deflection windings 30 through terminals X—X. A flyback signal representative of the horizontal retrace pulse is coupled back to horizontal oscillator and AFPC circuit 27 from horizontal deflection and high voltage circuit 28 to automatically control the horizontal oscillator frequency. The arrangements of FIG. 1 are illustrative only and their circuits performing similar functions may be used.

An external vertical sync pulse 48 at an output terminal A' of sync separator 26 is coupled to a vertical sync input terminal of a standard/nonstandard internal vertical sync producing circuit 70 embodying the invention. It is to be understood that external sync signal 48 may be at a standard or nonstandard vertical sync rate. Horizontal deflection flyback pulses of frequency $f_H$ are coupled from the horizontal oscillator and AFPC circuit 27 to a frequency doubler 46. The $2f_H$ pulses 47 from an output terminal B' of frequency doubler 46 are coupled to an input terminal B' of standard/nonstandard internal vertical sync circuit 70. The $2f_H$ pulses 47 serve as synchronizing clock pulses. Sync circuit 70 produces an internal vertical sync signal 49 which is coupled to a conventional vertical deflection circuit 66 to synchronize the scanning current produced at terminals Y.

Figure 2:
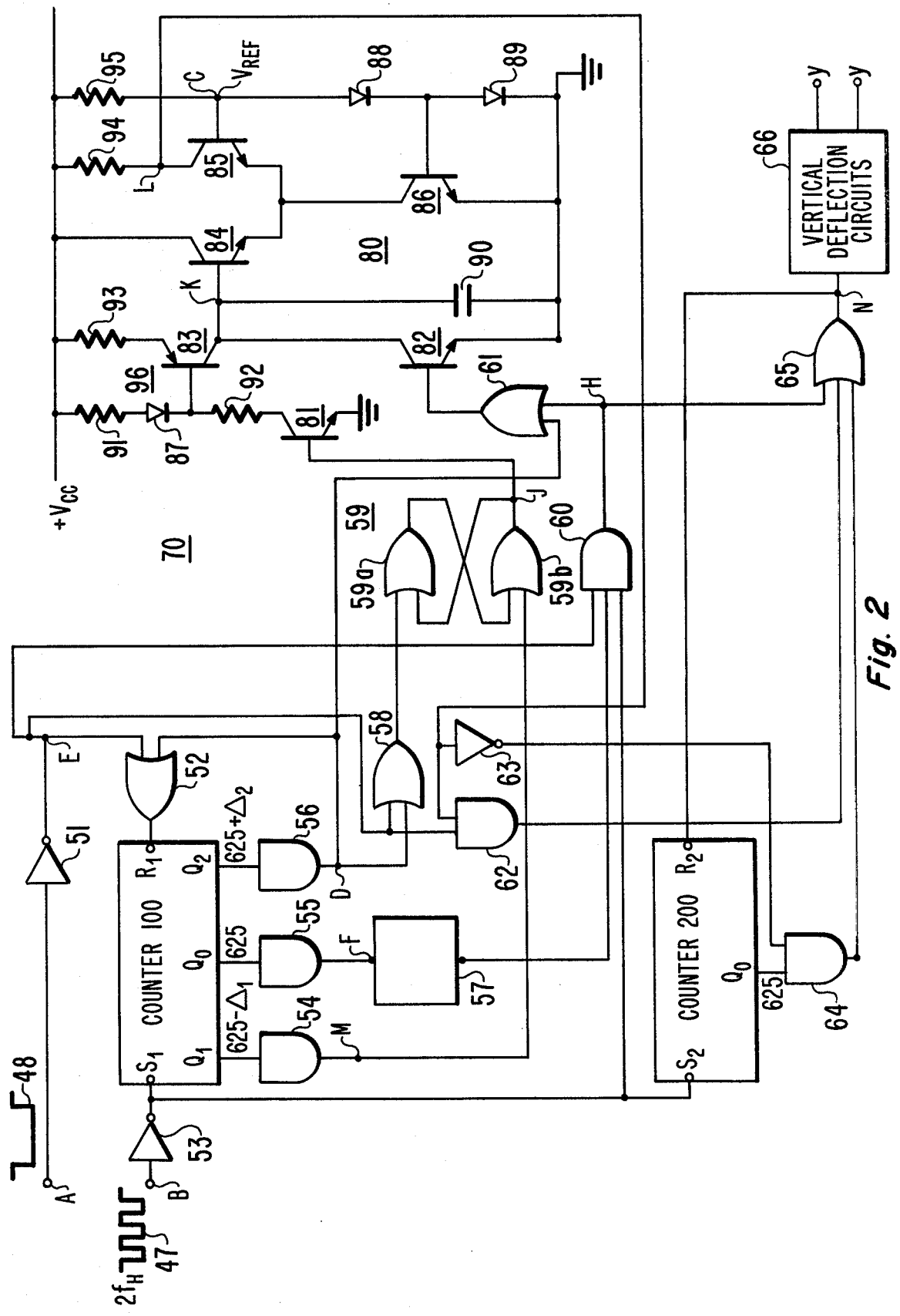
FIG. 2 illustrates a detailed circuit arrangement of one embodiment of the synchronization portion of FIG. 1 embodying the invention.

In FIG. 2, the $2f_H$ clock pulses are coupled from terminal B through an inverter 53 to a clock signal input terminal 52 of a counter 200. At a count of 625, a Q output terminal, $Q_0$, of counter 200 goes high. If the output of an inverter 63 is also high, the output of AND gate 64 goes high, generating a terminal N through an OR gate 65, an internal vertical sync signal 49 which is coupled to vertical deflection circuit 66. The vertical deflection circuit 66, in turn, drive a vertical deflection winding 34 of cathode ray tube 40 as shown in FIG. 1. Counter 200 is reset to zero through terminal $R_2$ by a high output from OR gate 65. Counter 200 thus provides internally generated vertical sync signals unless it is reset to zero before reaching a 625 count or unless AND gate 64 is disabled by a low output from inverter 63.

The operation of the remainder of circuit 70, upon arrival of a standard external vertical sync pulse of 50 Hz will now be described. Synchronizing clock pulses 47 of $2f_H$ frequency are coupled from terminal B to an input terminal $S_1$ of counter 100 through inverter 53. At a count of 625, an output terminal $Q_0$ of counter 100 goes high setting an output terminal F of an AND gate 55 high. AND gate 55 triggers a one-shot multivibrator 57 having producing a high level at an output terminal G for at least one clock pulse interval. Output terminal G is coupled to an AND gate 60 input terminal. Another input to AND gate 60 is coupled through inverter 53 to the $2f_H$ clock pulses of terminal B. A third input to gate 60 is coupled through inverter 51 to vertical sync input terminal A.

Upon arrival at terminal A of a standard 50 Hz vertical sync pulse during the 265th clock pulse interval, all three inputs of AND gate 60 go high indicating arrival of a standard external vertical sync pulse. An output terminal H of AND gate 60 goes high generating at terminal N of OR gate 65 a vertical sync signal 49 that is coupled to the vertical deflection circuits 66. Counter 200 is also reset to zero through terminal $R_2$ and synchronized with the external vertical input pulse.

Counter 100 is reset by the external vertical sync pulse 48 through an OR gate 52 and a reset terminal $R_1$ and is thus synchronized with the external vertical sync pulses 48.

The operation of circuit 70, upon arrival of a nonstandard external vertical sync pulse, will now be described. Counter 100 determines whether or not the nonstandard vertical sync pulse frequency is within acceptable limits by means of a lower limit AND gate 54 and an upper limit AND gate 56. Assume the lowest acceptable frequency for a nonstandard vertical sync pulse is one that occurs within $625 - \Delta_1$ clock pulses, and the upper limit is $625 + \Delta_2$ clock pulses. Assume illustratively that the nonstandard sync pulse frequency is within those limits, at a 636 line frequency, for example. Also assume $625 - \Delta_1$ is 608 clock pulses and $625 + \Delta_2$ is 640 clock pulses.

When counter 100 reaches its lower limit count of $625 - \Delta_1$ or 608, an output terminal $Q_1$ goes high, setting an output terminal M of AND gate 54 high. Output terminal M is coupled to a set input terminal of an RS flip-flop 59 comprising appropriately cross-coupled OR gates 59a and 59b. An output terminal J of RS flip-flop 59 is coupled to the base of a transistor 81 of a resettable delay circuit 80.

When output terminal M of lower limit AND gate 54 goes high, output terminal J of RS flip-flop 59 goes high, forward biasing transistor 81 into saturation. Transistor 81 is coupled through resistor 92 to a current mirror 96 comprising a diode 87, a transistor 83 and biasing resistors 91 and 93. One end of a capacitor 90 is coupled to the collector of transistor 83 at terminal K. The other end of capacitor 90 is coupled to ground. When transistor 81 is forward biased, current mirror 96 charges capacitor 90 and the voltage at terminal K increases.

Upon arrival of a nonstandard external vertical sync pulse at terminal B during the 636th clock pulse, terminal E goes high resetting output terminal J to its low level through an OR gate 58. Transistor 81 is cut off and capacitor 90 is no longer being charged during the field interval. The nonstandard external vertical sync pulse synchronizes counter 100 by resetting it to zero through OR gate 52 and terminal $R_1$. Counter 100 is now ready to start counting a subsequent field interval. Note that capacitor 90 has not been discharged at the end of the previous field interval.

At the second 608 clock pulse, capacitor 90 begins charging again; it stops charging upon receipt of the second nonstandard vertical sync pulse. The situation repeats itself for each subsequent field interval provided that a nonstandard vertical sync pulse is received during each field interval.

After a predetermined number of field intervals have elapsed, the voltage at terminal K has exceeded a reference voltage $V_{ref}$. Terminal K is coupled to the base of a transistor 84. Transistor 84 and a transistor 85 comprise a differential amplifier with an output terminal L. A transistor 86 and a diode 89 comprise a constant current sink for the differential amplifier. A diode 88 and a resistor 95 provide biasing, such that the base of transistor 85 is at the $V_{ref}$ voltage level.

When the voltage at terminal K exceeds $V_{ref}$, transistor 85 is cut off and terminal L, which is coupled to a $+V_{cc}$ supply through a resistor 94, goes high. Thus, terminal L goes high after a predetermined number of non-standard external vertical sync pulse field intervals have elapsed.

After terminal L goes high, internally generated vertical sync signals are in synchronization with subsequent nonstandard external vertical sync signals. One input terminal of an AND gate 62 is coupled to terminal L and another input terminal is coupled to vertical sync input terminal E. Thus, a nonstandard external vertical sync pulse sets the output of AND gate 62 high, which sets the output terminal N of OR gate 65 high, which drives vertical deflection circuits 66 and resynchronizes counter 200 by resetting it to zero. Counter 100 is also resynchronized when it is also reset to zero.

So long as nonstandard external vertical sync pulses arrive at terminal A, transistor 82 will not conduct and capacitor 90 will not be discharged. The output terminal L remains high and the internal vertical sync signals are in synchronization with the external nonstandard vertical sync pulses. If no vertical sync pulse within acceptable frequency limits is received at terminal A, counter 100 continues to count until a $Q_2$ output terminal is set high at clock pulse $625 + \Delta_2$, that is, at clock pulse 640. When $Q_2$ is set high, an output terminal D of upper limit AND gate 56 is also set high, thereby resetting the output terminal J of RS flip-flop 59 to its low value.

The output of AND gate 56 is coupled to the base of a discharge transistor 82 through an OR gate 61. The collector of transistor 82 is coupled to the capacitor 90 at terminal K. The emitter of transistor 90 is coupled to ground.

If no acceptable nonstandard vertical sync pulse is received, the output terminal D goes high, forward biasing transistor 82 into saturation. Capacitor 90 is quickly discharged and the voltage at terminal K reaches ground level. Output terminal L goes low, disabling AND gate 62 and enabling AND gate 64. Only internal vertical sync pulses of a standard frequency are now generated at terminal N.

Arrival of a standard external vertical sync pulse 48 at terminal A at any time will also discharge capacitor 90. Upon receipt of a standard external vertical sync pulse, the output terminal H of AND gate 60 is set high, as described previously. Output terminal H is coupled to the base of transistor 82 through OR gate 61. Thus, when output terminal H goes high, transistor 82 is forward biased into saturation and capacitor 90 is discharged, as in the previous situation.

If the nonstandard external vertical sync pulse occurs between 625 − $\Delta_1$ and 625 clock pulses, for example, 620 clock pulses, standard/nonstandard internal vertical sync circuit 70 operates in a manner similar to that as described previously for the nonstandard external vertical sync pulse of 636 clock pulses.

It should be noted that during the waiting period of a predetermined number of field intervals, the vertical deflection circuits 66 are being driven by the internally generated vertical sync signals of counter 200. AND gate 64 is enabled and AND gate 62 is disabled for as long as output terminal L is low. It is only after the predetermined interval has elapsed that the internal vertical sync pulses will drive the vertical deflection circuits 66 in synchronization with the nonstandard external vertical sync pulses.

It should be apparent from the above discussion, that delay circuit 80 acts to distinguish nonstandard vertical sync pulses from noise pulses that, by chance, occur within the interval established by AND gates 54 and 56. In order for the standard/nonstandard internal vertical sync circuit 70 to switch from the standard to the nonstandard mode, delay circuit 80 requires a predetermined number of consecutive vertical field intervals to elapse, during which nonstandard external vertical sync pulses must occur. One noise-free field interval without a nonstandard external sync pulse signal is enough to discharge capacitor 90. If an appropriate length for the waiting period is chosen, circuit 70 will find at least one vertical field interval unaffected by noise.

Circuit 70 also provides for vertical output drive noise immunity when it is in its standard mode of operation. Long noise pulses are received at terminal A from the sync separator 26 through terminal A'. These noise pulses reset counter 100 through OR gate 52 and reset terminal $R_1$. Counter 100 is thus reset to zero before achieving the 625th count. The output of coincidence 625 AND gate 60 does not go high, and the noise pulse does not generate an internal vertical sync pulse at terminal N. Counter 200 is not reset until it counts to 625, at which time it provides an internally generated vertical sync pulse through AND gate 64. Vertical sync pulses are thus generated synchronously with the true standard external vertical sync pulses and remain unaffected by the noise.

Figure 3:
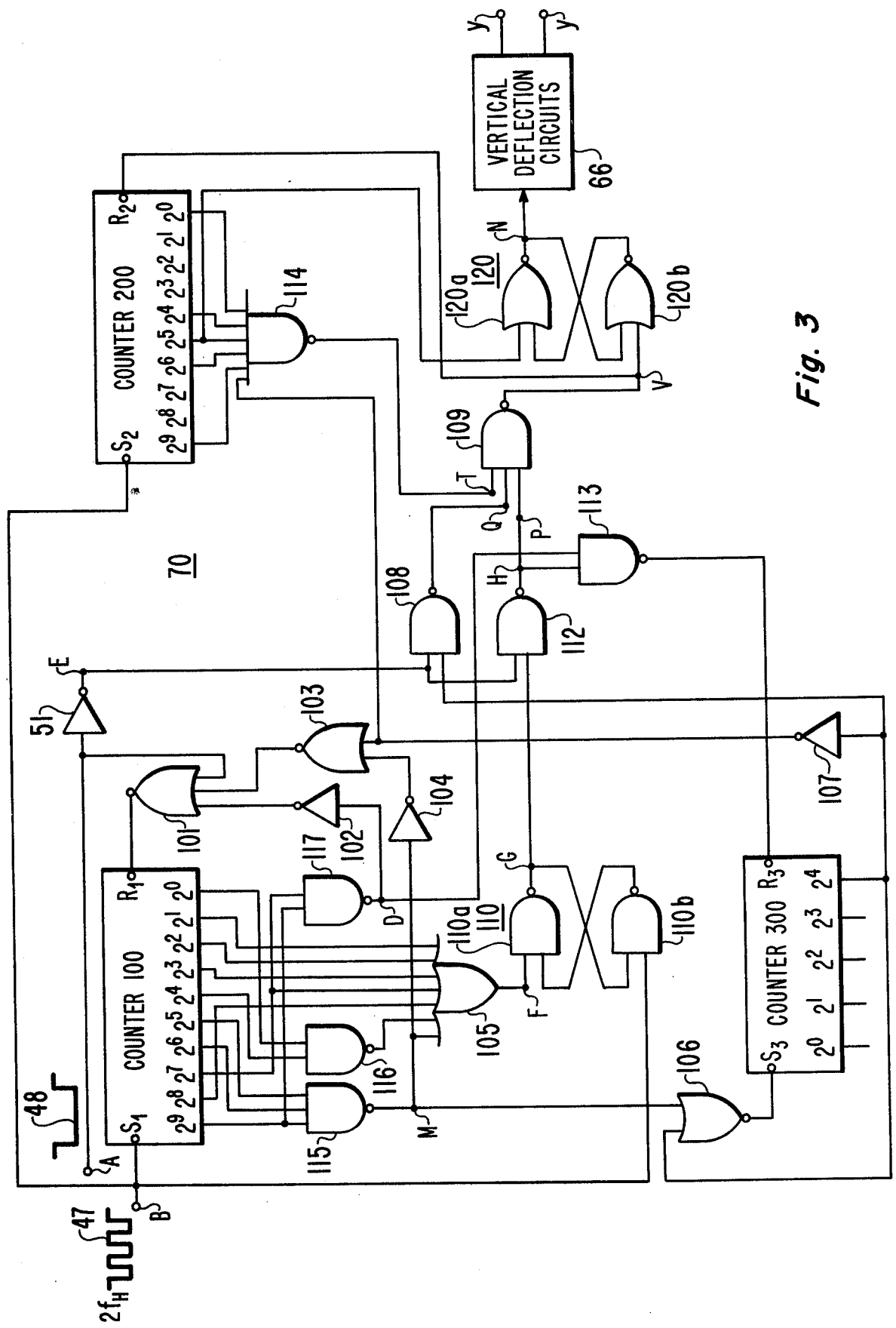
FIG. 3 illustrates another embodiment of a detailed circuit arrangement of a sync system according to the invention.

The circuit of FIG. 3 illustrates another embodiment of the invention more suitable for integrated circuit manufacture. Resettable delay circuit 80 has been replaced by a third counter 300 whose count is started during every field interval that a nonstandard external vertical sync pulse 48 arrives at an input terminal A. After a predetermined number of field intervals, illustratively shown as sixteen intervals, a $2^4$ binary output terminal of counter 300 goes high, permitting the internally generated vertical sync pulses 49 at a terminal N to be synchronized with the nonstandard external vertical sync pulses.

One-shot multivibrator 57, used in FIG. 2 to determine the coincidence between an external vertical sync pulse and the 625 count of counter 100, has been replaced in FIG. 3 by an RS flip-flop 110 comprising an appropriately cross-coupled pair of NAND gates 110a and 110b. Output terminal N, instead of being coupled to the output of an OR gate as in FIG. 2, is now coupled to the output of an RS flip-flop 120 comprising an appropriately cross-coupled pair of NOR gates 120a and 120b.

Lower limit AND gate 54 has been replaced by a lower limit NAND gate 115, whose input terminals are coupled to the appropriate binary output terminals of counter 100, shown in FIG. 3 illustratively as the $2^9$, $2^6$ and $2^5$ binary output terminals indicating a lower limit of 608 lines. At a count of 608, the input terminals of NAND gate 115 go high, and an output terminal M goes low. Upper limit AND gate 56 has been replaced by an upper limit NAND gate 117, whose input terminals are coupled to the appropriate binary output terminals of counter 100, shown in FIG. 3 illustratively as the $2^9$ and the $2^7$ binary output terminals indicating an upper limit of 640 lines. At a count of 640, the input terminals of NAND gate 117 go high, and an output terminal D goes low.

The operation of standard/nonstandard vertical sync circuit 70 of FIG. 3, upon arrival of a standard external vertical sync pulse, will now be described. $2f_H$ synchronizing clock pulses 47 are coupled from an input terminal B to an input terminal $S_1$ of a counter 100 to start its operation. When the count reaches 608, the lower limit at which circuit 70 will process a nonstandard external vertical sync pulse output terminal M of NAND gate 115 goes low.

Output terminal M is coupled to an input terminal of a NOR gate 106. Another input terminal of NOR gate 106 is coupled to the $2^4$ output terminal of counter 300. The $2^4$ output terminal is low because circuit 70 is in the standard mode of operation. Thus, at the 608 count of counter 100, both inputs to NOR gate 106 are low, and the NOR gate output terminal goes high.

The output terminal of NOR gate 106 is coupled to an input terminal $S_3$ of counter 300, and when it goes high, counter 300 starts to count, and a $2^0$ output terminal of counter 300 goes high, indicating that the first field interval of the 16 field predetermined waiting period is about to elapse.

At a count of 625, binary output terminals $2^0$, $2^4$, $2^5$, $2^6$ and $2^9$ of counter 100 go high while the other binary output terminals remain low. The $2^0$ and the $2^4$ binary output terminals are coupled to input terminals of NAND gate 116. An output terminal of NAND gate 116 is coupled to an input terminal of OR gate 105. Output terminal M and binary output terminals $2^1$, $2^2$, $2^3$, $2^7$ and $2^8$ are also coupled to input terminals of OR gate 105.

At a count of 625, all the input terminals of OR gate 105 go low. An output terminal F of OR gate 105 is coupled to a set input terminal of RS flip-flop 110. A reset input terminal of RS flip-flop 110 is coupled to the $2f_H$ input terminal B. When output terminal F goes low, an output terminal G of RS flip-flop 110 is set high at the instant that the trailing edge of the 625th clock pulse arrives at the reset input terminal. Output terminal G remains high until the next $2f_H$ clock pulse resets output terminal F of OR gate 105 to its low value. Then, output terminal G goes low.

When a standard external vertical sync pulse arrives at terminal A during the 625th clock pulse, an input terminal E, which is coupled to an output terminal of an inverter 51, goes high. Input terminal E is coupled to an input terminal of a NAND gate 112. Another input terminal of NAND gate 112 is coupled to output terminal G of RS flip-flop 110.

Upon arrival of standard vertical sync pulse at terminal A, both inputs to NAND gate 112 go high, thereby setting an output terminal H of NAND gate 112 low. When terminal H, which is coupled to an input terminal of NAND gate 113, goes low, an output terminal of NAND gate 113 goes high, thereby resetting counter 300 to zero through a terminal $R_3$. All the outputs of counter 300 then go low indicating that a standard external vertical sync signal has arrived and that the count of the number of field intervals, during which nonstandard external vertical sync pulses have occurred, has been reset to zero.

Output terminal H is also coupled to an input terminal P of a NAND gate 109, whose output terminal V is coupled to a reset terminal $R_2$ of a counter 200 and to a set input terminal of RS flip-flop 120. Internally generated vertical sync signals 49 at output terminal N of RS flip-flop 120 are coupled to vertical deflection circuits 66 which drive the vertical deflection winding 34 of FIG. 1.

When output terminal H goes low upon arrival of a standard external vertical sync signal, output terminal V goes high resetting counter 200 to zero and thereby synchronizing it with the signal. All the binary output terminals of counter 200 are reset low, including a $2^5$ output terminal, which is coupled to a reset input terminal of RS flip-flop 120.

When output terminal V goes high upon arrival of a standard external vertical sync pulse, output terminal N of RS flip-flop 120 goes high, thus providing an internal vertical sync pulse to drive the vertical deflection circuits 66 in synchrony with the standard external vertical sync pulses. Since the reset terminal of RS flip-flop is coupled to the $2^5$ output terminal of counter 200, the duration of the internal vertical sync pulse is 32 clock pulses. When the count of counter 200 reaches 32, the $2^5$ binary output terminal goes high, resetting output terminal N low. Different durations for the internal vertical sync pulse can be achieved by the appropriate couplings of the binary output terminals of counter 200 to NAND gate 114.

Arrival of a standard external vertical sync pulse at terminal A will reset counter 100 to zero, thereby synchronizing it to the signals, as will now be explained. Output terminal M, which is presently low, sets high the input terminal of a NOR gate 103 through an inverter 104, setting a first input terminal of a NOR gate 101 low. Output terminal D of NAND gate 117 is presently high, setting a second input terminal of NOR gate 101 low through an inverter 102. A third input terminal of NOR gate 101 is coupled to input terminal A. Upon arrival of a standard vertical sync pulse, all three input terminals of NOR gate 101 are low, setting reset terminal $R_1$ high and thereby resetting counter 100.

If no acceptable external vertical sync pulses of frequency between $625 - \Delta_1$ and $625 + \Delta_2$ arrive at terminal A, the internal vertical sync pulses 49 at output terminal N are derived from counter 200 at a standard 625 count rate, as will now be explained. In this situation, input terminal P must always be high, since output terminal G, which indicates the arrival of a standard external signal, is low. Input terminal Q must always be high, since the $2^4$ output terminal of counter 300, which indicates the number of field intervals elapsed during the waiting period, is low. Thus, output terminal V must go high in order to provide an internal vertical sync pulse at terminal N. For terminal V to go high, input terminal T must then go low. Terminal T goes low every time counter 200 reached a count of 625 because all the inputs to an AND gate 114, whose output terminal is coupled to terminal T, will then go high. Thus, an internal vertical sync pulse is generated at a standard 625 line rate. After terminal V goes high, counter 200 is reset to zero.

The operation of standard/nonstandard vertical sync circuit 70, upon arrival of a nonstandard external sync pulse, will now be described. Assume a nonstandard sync pulse occurring at 636 clock pulses. At a count of $625 - \Delta_1 = 608$, the stored count of counter 300, as described previously, is increased one count. At a count of 625, counter 200, as previously described, sets output terminal T low, which generates an internal vertical sync pulse at terminal N. At a count of 636, a nonstandard external vertical sync pulse arrives at terminal A and resets counter 100 to zero, as described previously. Note that counter 300 is not reset to zero, and the next 608th clock pulse will again increase the count of counter 300 by one. Counter 300 will not be reset provided that nonstandard vertical sync pulses arrive at terminal A during each field interval. After a predetermined number of field intervals, illustratively shown in FIG. 3 as 16, the $2^4$ binary output of counter 300 goes high. It should be noted that during this predetermined time interval, internal vertical sync pulses are derived at a 625 line rate from counter 200.

The $2^4$ binary output terminal of counter 300 is coupled to an input terminal of NAND gate 114 through an inverter 107. So long as the $2^4$ terminal remains high, that is, so long as nonstandard external vertical sync pulses arrive after the predetermined time period, the corresponding input terminal at NAND gate 114 remains low and the output terminal T remains high. This means that counter 200 can no longer generate internal vertical sync pulses.

Upon arrival of a nonstandard external vertical sync pulse, terminal E and an input terminal to NAND gate 108 goes high. The other input terminal of NAND gate is coupled to the $2^4$ terminal of counter 300 and is also high. Input terminal Q goes low, and output terminal V goes high generating an internal vertical sync pulse 49 in synchronism with the nonstandard external vertical sync pulse 48. Arrival of a standard external vertical sync pulse 48 will then cause the standard/nonstandard internal vertical sync circuit 70 to change back to its standard mode of operation.

What is claimed is:

1. Apparatus for producing internal vertical sync signals at an output terminal in response to standard and nonstandard rate external vertical signals, comprising:
    first resettable counting means responsive to said external vertical signals, the count of said first counting means being incremented in response to a source of incrementing signals repeating at a frequency integrally related to the frequency of said standard rate external vertical signals, said first resettable counting means being reset in the presence of said external vertical signals;
    coincidence means coupled to said first counting means and responsive to said external vertical signals for providing a coincidence signal when said external vertical signals are repeating at a standard rate;

detection means responsive to said external vertical signals for providing after the elapse of a predetermined time interval a detection signal indicative of the presence of said nonstandard rate external vertical signals;

second resettable counting means responsive to said source of incrementing signals for providing only a standard rate internal signal;

first signaling means coupled to said second resettable counting means and responsive to said detection signal and said external vertical signals for providing in place of said standard rate internal signal a nonstandard internal signal repeating at a nonstandard rate; and sync producing means responsive to said coincidence signal, said standard rate internal signal and said nonstandard internal signal for producing said internal vertical sync signals upon the occurrence of one of said coincidence signal, said standard rate internal signal and said nonstandard internal signal, said second counting means being reset upon such occurrence.

2. Apparatus according to claim 1 wherein the frequency of said incrementing signals is twice the horizontal deflection rate frequency.

3. Apparatus according to claim 1 including means coupled to said first resettable counting means for establishing a predetermined frequency range about the frequency of said standard rate external vertical signals for enabling the generation of said nonstandard internal signal only when said external vertical signals are present within said predetermined frequency range.

4. Apparatus according to claim 1 wherein said detection means comprises means responsive to a predetermined number of said nonstandard rate external vertical signals for successively charging a capacitor for providing said detection signal when the voltage across said capacitor exceeds a reference voltage for determining the elapse of said predetermined time interval.

5. Apparatus according to claim 4 wherein said detection means comprises a third resettable counting means, the count of said third resettable counting means being incremented by each of a predetermined number of said nonstandard rate external vertical signals, an output of said third resettable counting means indicative of the elapse of said predetermined time interval.

6. Apparatus according to claim 5 including means coupled to said first resettable counting means for establishing a predetermined frequency range about the frequency of said standard rate external vertical signals for enabling the generation of said nonstandard internal signal only when said external vertical signals are present within said predetermined frequency range.

* * * * *

UNITED STATES PATENT AND TRADEMARK OFFICE
CERTIFICATE OF CORRECTION

PATENT NO. : 4,096,528

DATED : June 20, 1978

INVENTOR(S) : Alois Vaclav Tuma et al.

It is certified that error appears in the above-identified patent and that said Letters Patent is hereby corrected as shown below:

Column 3, line 24, that portion reading "265th" should read -- 625th --.

Signed and Sealed this

Twentieth Day of March 1979

[SEAL]

Attest:

RUTH C. MASON
Attesting Officer

DONALD W. BANNER
Commissioner of Patents and Trademarks